(12) United States Patent
Guecker et al.

(10) Patent No.: US 11,220,263 B2
(45) Date of Patent: Jan. 11, 2022

(54) METHOD FOR THE OPEN-LOOP OR CLOSED-LOOP CONTROL OF A DRIVER ASSISTANCE SYSTEM OF A VEHICLE, AND DRIVER ASSISTANCE SYSTEM

(71) Applicant: KNORR-BREMSE SYSTEME FUER NUTZFAHRZEUGE GMBH, Munich (DE)

(72) Inventors: Ulrich Guecker, Schwieberdingen (DE); Markus Klein, Pforzheim (DE); Jan Mayer, Freiberg am Neckar (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 382 days.

(21) Appl. No.: 16/327,911

(22) PCT Filed: Aug. 9, 2017

(86) PCT No.: PCT/EP2017/070257
§ 371 (c)(1),
(2) Date: Feb. 25, 2019

(87) PCT Pub. No.: WO2018/041575
PCT Pub. Date: Mar. 8, 2018

(65) Prior Publication Data
US 2019/0202455 A1 Jul. 4, 2019

(51) Int. Cl.
*B60W 30/12* (2020.01)
*B60W 50/14* (2020.01)
(Continued)

(52) U.S. Cl.
CPC ........... *B60W 30/12* (2013.01); *B60K 28/066* (2013.01); *B60T 7/14* (2013.01); *B60T 7/22* (2013.01);
(Continued)

(58) Field of Classification Search
CPC .. B60W 30/12; B60W 10/18; B60W 2420/42; B60W 2710/20; B60W 2420/62;
(Continued)

(56) References Cited

U.S. PATENT DOCUMENTS 9,758,163 B2 * 9/2017 Van Dan Elzen .... B60W 10/20
2009/0021358 A1 1/2009 Lee et al.
(Continued)

FOREIGN PATENT DOCUMENTS

DE 29909873 U1 4/2000
DE 102004024692 A1 12/2005
(Continued)

OTHER PUBLICATIONS

Takahashi Issey et al., "Automated safety vehicle stop system for cardiac emergencies", 2016 IEEE International Conference on Emerging Technologies and Innovative Business Practice for the Transformation of Societies (Emergitech), IEEE, Aug. 3, 2016, pp. 9-12.
(Continued)

*Primary Examiner* — Angela Y Ortiz
*Assistant Examiner* — Bright Djiekpor
(74) *Attorney, Agent, or Firm* — Norton Rose Fulbright US LLP; Gerard Messina; Aaron Deditch (57) ABSTRACT

A method for open-loop or closed-loop control of a driver assistance system of a vehicle, including: a) using a first sensor device to detect from a roadway at least one lane and a roadway marking that separates the lane from an edge of the roadway; b) using a second sensor device to detect operation of at least one operating device of the vehicle that influences the driving dynamics of the vehicle by virtue of the driver; c) using steering actuators and/or brake actuators to influence the driving dynamics of the vehicle; and d) outputting, if there is a threat of the vehicle leaving the lane,
(Continued)

as detected by the first sensor device, a first warning signal. A related driver assistance system is also described.

20 Claims, 5 Drawing Sheets (51) Int. Cl.
*B60K 28/06* (2006.01)
*B60W 50/16* (2020.01)
*B60T 7/14* (2006.01)
*B62D 15/02* (2006.01)
*B60T 8/1755* (2006.01)
*B60T 7/22* (2006.01)
*B60W 10/18* (2012.01)
*B60W 10/20* (2006.01)

(52) U.S. Cl.
CPC ......... *B60T 8/17557* (2013.01); *B60W 10/18* (2013.01); *B60W 10/20* (2013.01); *B60W 50/14* (2013.01); *B60W 50/16* (2013.01); *B62D 15/025* (2013.01); *B60T 2201/022* (2013.01); *B60T 2201/08* (2013.01); *B60T 2201/083* (2013.01); *B60T 2201/087* (2013.01); *B60W 2420/42* (2013.01); *B60W 2420/52* (2013.01); *B60W 2420/62* (2013.01); *B60W 2556/60* (2020.02); *B60W 2710/18* (2013.01); *B60W 2710/20* (2013.01)

(58) Field of Classification Search
CPC .... B60W 2420/52; B60K 28/066; B60T 7/14; B60T 7/22; B60T 8/17557; B60T 2201/022; B60T 2201/087; B60T 2201/083; B60T 2201/08
See application file for complete search history.

(56) References Cited

U.S. PATENT DOCUMENTS

| 2010/0231374 | A1 | 9/2010 | Endo et al. |
| 2011/0044507 | A1 | 2/2011 | Strauss et al. |
| 2015/0175159 | A1 | 6/2015 | Gussner et al. |
| 2017/0297623 | A1 | 10/2017 | Busch et al. |

FOREIGN PATENT DOCUMENTS

| DE | 102004027085 A1 | * | 12/2005 | .......... B60T 8/17557 |
| DE | 102004047861 A1 | * | 4/2006 | ........... B62D 15/029 |
| DE | 102004047861 A1 | | 4/2006 | |
| DE | 102005037273 A1 | | 2/2007 | |
| DE | 102006058412 A1 | | 6/2008 | |
| DE | 102008005999 A1 | | 7/2009 | |
| DE | 102009016936 A1 | | 11/2009 | |
| DE | 102011109618 A1 | | 2/2013 | |
| DE | 102012208712 A1 | | 11/2013 | |
| DE | 102014217694 A1 | | 3/2016 | |
| EP | 1752362 B1 | | 10/2008 | |
| EP | 2487085 A2 | | 8/2012 | |
| WO | 2005/118372 A1 | | 12/2005 | |

OTHER PUBLICATIONS

Saito Yuichi et al., "Dual Control Theoretic Driver Assistance—Dynamic Characteristics of Steering Torque Control based on Linear Quadratic Regulator", 2014 IEEE International Conference on Systems, Man, and Cybernetics (SMC), IEEE, Oct. 5, 2014, pp. 1738-1743.

International Search Report dated Nov. 22, 2017, of the corresponding International Application PCT/EP2017/070257 filed Aug. 9, 2017.

* cited by examiner

METHOD FOR THE OPEN-LOOP OR CLOSED-LOOP CONTROL OF A DRIVER ASSISTANCE SYSTEM OF A VEHICLE, AND DRIVER ASSISTANCE SYSTEM

FIELD OF THE INVENTION

The present invention is based on a method for open-loop or closed-loop control of a driver assistance system of a vehicle and on a driver assistance system.

BACKGROUND INFORMATION

Driver assistance systems are lane keeping assistance systems with automatic intervention in the vehicle dynamics or automatic lane correction, which are also referred to as intervening lane keeping assistance systems, LDP (lane departure prevention), LKS (lane keeping system) or LKAS (lane keeping assistant system). The lane keeping assistance systems detect the vehicle environment by an ambient sensor system and intervene in the vehicle dynamics in order to prevent the vehicle from leaving the lane. This can involve different actuators of the vehicle being actuated, in particular the vehicle steering and/or brakes. Automatic interventions in the vehicle steering are possible in particular in the case of electromechanical steering (EPS, electric power steering), active steering (AFS, active front steering) or RWS (rear wheel steering). Braking interventions can be effected in particular by unilateral braking interventions or asymmetric braking interventions. The interventions in the vehicle actuator system impart a yaw moment around the vertical axis of the vehicle, said yaw moment provoking the vehicle to produce a yaw movement in order to prevent the lane from being left.

The level of automation in this case ranges from systems that apply artificial steering/braking forces to instruct the driver how he ought to operate the steering in order to keep the vehicle in its lane (semiautomatic systems) to LKS systems that drive the vehicle in its lane fully automatically.

A method of the type in question and a driver assistance system of the type in question are discussed in DE 101 14 470 A1. In that case, the distance of the right-hand vehicle boundary from the right-hand edge of the roadway and the distance of the left-hand vehicle boundary from the left-hand edge of the roadway and also the changes in these variables over time are determined. On the basis of this information, an algorithm is used to decide whether intervention in the steering is required. In a warning mode, a visual, audible and/or haptic (e.g. shaking steering wheel) warning signal is output in this case that prompts the driver to manually intervene in the steering. If, by contrast, a control mode is activated, then instead an appropriate correction command is output to a steering actuating element that then pulls the vehicle into the middle of the lane.

If the driver's health is suddenly affected or if he has fallen asleep while driving, however, it is not impossible for him not to detect the warning signal. The vehicle would then be automatically pulled into the middle of the lane by the LKS system and would sometimes come to a standstill there, which can result in serious collisions.

SUMMARY OF THE INVENTION

The present invention is by contrast based on the object of developing a method for open-loop or closed-loop control of a driver assistance system or a driver assistance system of the type mentioned at the outset further such that it has a higher level of safety from accidents.

This object may be achieved according to the invention by the features described herein.

The invention is based on a method for open-loop or closed-loop control of a driver assistance system of a vehicle, in which a) a first sensor device is used to detect from a roadway at least one lane and a roadway marking that separates the lane from an edge of the roadway, and b) a second sensor device is used to detect operation of at least one operating device of the vehicle that influences the driving dynamics of the vehicle by virtue of the driver, c) steering actuators and/or brake actuators are used to influence the driving dynamics of the vehicle, and in which d) a threat of the vehicle leaving the lane, as detected by the first sensor device, results in a first warning signal being output.

According to the invention, the method has provision that e) if operation of the at least one operating device influencing the driving dynamics of the vehicle by virtue of the driver is detected by the second sensor device within a first firmly prescribed or variable period that begins immediately after output of the first warning signal, there is no automatic intervention in the driving dynamics of the vehicle by the steering actuators and/or brake actuators, f) but if operation of the at least one operating device influencing the driving dynamics of the vehicle by virtue of the driver is not detected by the second sensor device within the first prescribed or variable period that begins immediately after output of the first warning signal, but crossing of the lane marking by at least one wheel of the vehicle that has already taken place is detected by the first sensor device, then g) a second warning signal is output and the vehicle is automatically kept in the crossed state of the roadway marking as automatic intervention in the driving dynamics of the vehicle by the steering actuators and/or the brake actuators and is taken further along the crossed roadway marking such that a longitudinal centerline of the vehicle is offset from the roadway marking by less than a prescribed maximum lateral offset, and h) if operation of the at least one operating device influencing the driving dynamics of the vehicle by virtue of the driver is detected by the second sensor device within a second firmly prescribed or variable period that begins immediately after output of the second warning signal, then the automatic intervention in the driving dynamics of the vehicle is terminated, but if i) operation of the at least one operating device influencing the driving dynamics of the vehicle by virtue of the driver is not detected by the second sensor device within the second firmly prescribed or variable period that begins immediately after output of the second warning signal, then i1) the vehicle continues to be automatically kept in the crossed state of the roadway marking by the steering actuators and/or the brake actuators and can be taken further along the crossed roadway marking such that the longitudinal centerline of the vehicle is offset from the roadway marking by less than a prescribed maximum lateral offset, and i2) the vehicle is automatically slowed to a standstill immediately after expiry of the second prescribed or variable period or with a time delay after this expiry.

The expression "if operation of the at least one operating device influencing the driving dynamics of the vehicle by virtue of the driver is detected by the second sensor device" in feature e) means that the driver intervenes or has intervened in the driving dynamics of the vehicle by having operated for example the accelerator pedal, the brake pedal or the steering wheel of the vehicle. As a result, the driver signals that he has taken responsibility by intervening in the driving dynamics of the vehicle, which means that there is also no need for automatic intervention in the driving dynamics of the vehicle by the steering actuators and/or brake actuators to take place.

Such operation by the driver can be detected for example by the electrical signals from electrical measurement pickups, which are present anyway for today's customary electrical accelerator pedals, electrical brake pedals and for steering systems in the form of steering angle sensors.

The expression "if crossing of the roadway marking by at least one wheel of the vehicle that has already taken place is detected by the first sensor device" in feature f) means that the at least one wheel of the vehicle has already traveled across the roadway marking completely, so that part of the vehicle is already on the far side of the roadway marking and hence also outside the lane and on the edge of the roadway.

The first sensor device may be used to detect crossing of the roadway marking by at least two wheels on different axles and on one side of the vehicle that has taken place before step g) of claim 1 is carried out.

Then, according to feature g), a second warning signal is output and the vehicle is automatically kept in the partially crossed state of the roadway marking as automatic intervention in the driving dynamics of the vehicle by the steering actuators and/or the brake actuators and, in the process, is taken further parallel to the roadway marking along this crossed roadway marking, wherein the longitudinal centerline of the vehicle is offset from the roadway marking by less than a prescribed maximum lateral offset. The prescribed maximum lateral offset of the longitudinal centerline from the roadway marking is in this case possible on both sides, i.e. to the right and left of the roadway marking, and may be less than half the track of the vehicle, in order to ensure that at least one wheel always still runs on the far side of the roadway marking. The roadway marking as the right-hand or left-hand boundary marking of the roadway is then a target trajectory for the vehicle. This target trajectory can be achieved by open-loop or closed-loop control, in particular closed-loop steering control (LKS), within the driver assistance system.

In the case of closed-loop steering control (LKS), an electronic steering controller is present and also a steering actuating element that actively affects a steering of the vehicle. The lateral offset of the longitudinal centerline of the vehicle in relation to the roadway marking, which is possible in both directions, is then the controlled variable and is prescribed as a setpoint variable.

In this case the automatic intervention in the driving dynamics of the vehicle by the steering actuators and/or the brake actuators may be carried out such that in this case the roadway marking is arranged between the wheels of the axles of the vehicle. The vehicle may then move with a first part, pointing at the lane, or with those wheels on its axles that are pointing at the lane, still in the lane, while the remaining, second part of the vehicle, separated from the first part by the roadway marking and pointing away from the lane, or those wheels on the axles that are pointing away from the lane, moves on the edge of the roadway, what is known as the shoulder of the road, which is that part of the crown of the road that is next to the roadway or lane in the road cross section of the and that is often bounded by an embankment at the side.

In summary, the method is a sequence of essentially three fundamental method steps, the measures, e.g. automatic interventions in the driving dynamics of the vehicle, becoming ever more intensive as the number of method steps increases if the driver himself does not intervene, namely:

1. A threat of the lane being left results in a first warning signal being output.
2. If the driver does not react to the first warning signal, there is a wait until the roadway marking is crossed by at least one wheel of the vehicle. A second warning signal is then output and the vehicle is kept on a target trajectory along the already crossed roadway marking by automatic steering interventions.
3. If the driver does not react to the second warning signal, the vehicle is automatically still kept on the target trajectory along the already crossed roadway marking and automatically slowed to a standstill.

Consequently, pulling the vehicle back to the middle of the lane as in the prior art is avoided. If the driver's health is thus affected or if he has fallen asleep while driving and is consequently no longer in control of the situation, it is possible for collisions with the vehicles following in the lane to be avoided because there is still sufficient space in the lane for evasive action or overtaking on the left.

The automatic intervention in the driving dynamics of the vehicle may be accomplished by an auxiliary steering device and/or a steer-by-brake system. By way of example, there is electromechanical or electrical steering augmented by the auxiliary steering system, which then effects automatic steering intervention as automatic intervention in the driving dynamics. Alternatively or additionally, the automatic intervention in the driving dynamics of the vehicle, which then drives the latter along the roadway marking by automatic braking intervention, can be carried out in particular by unilateral or asymmetric braking intervention.

To this end, an electronic control device of the driver assistance system can directly or indirectly actuate wheel brakes and/or the auxiliary steering device of the vehicle.

According to a development of the method, the vehicle in the state slowed to a standstill is put into a safe mode in which at least one of the following actions is performed: a parking brake is applied, the braking pressure most recently in effect in a service brake is maintained, hazard lights are switched on. Furthermore, still further safety measures can be taken, such as for example tightening restraining devices such as safety belts. This allows the vehicle occupants to be better protected.

The invention is also based on a driver assistance system of a vehicle, having a) a first sensor device that is used to detect from a roadway at least one lane and a roadway marking that separates the lane from an edge of the roadway, and b) a second sensor device that is used to detect operation of at least one operating device of the vehicle that influences the driving dynamics of the vehicle by virtue of the driver, and c) an electronic control device receiving sensor signals from the first sensor device and from the second sensor device, and d) a warning device that is controlled by the electronic control device and outputs warning signals, and e) steering actuators and/or brake actuators that are controllable by the electronic control device and by which the driving dynamics of the vehicle are influenceable, wherein f) the electronic control device is configured so that a threat of the vehicle leaving the lane, as detected by the first sensor device, results in it actuating the warning device to output a first warning signal.

According to the invention, said driver assistance system is characterized in that g) the control device interacts with a timing device and is furthermore configured so that h) if operation of the at least one operating device influencing the driving dynamics of the vehicle by virtue of the driver is detected by the second sensor device within a first firmly prescribed or variable period that begins immediately after output of the first warning signal, the control device does not initiate automatic intervention in the driving dynamics of the vehicle by the steering actuators and/or brake actuators, i) but if operation of the at least one operating device influencing the driving dynamics of the vehicle by virtue of the driver is not detected by the second sensor device within the first firmly prescribed or variable period that begins immediately after output of the first warning signal, but crossing of the roadway marking by at least one wheel of the vehicle that has taken place is detected by the first sensor device, then j) the warning device is actuated to output a second warning signal and the vehicle is automatically kept in the crossed state of the roadway marking as automatic intervention in the driving dynamics of the vehicle by the steering actuators and/or the brake actuators and, in the process, is taken further along the crossed roadway marking parallel such that a longitudinal centerline of the vehicle is offset from the roadway marking by less than a prescribed maximum lateral offset, and k) if operation of the at least one operating device influencing the driving dynamics of the vehicle by virtue of the driver is detected by the second sensor device within a second firmly prescribed or variable period that begins immediately after output of the second warning signal, then the automatic intervention in the driving dynamics of the vehicle is terminated, but if l) operation of the at least one operating device influencing the driving dynamics of the vehicle by virtue of the driver is not detected by the second sensor device within the second firmly prescribed or variable period that begins immediately after output of the second warning signal, then l1) the vehicle continues to be automatically kept in the crossed state of the roadway marking by the steering actuators and/or the brake actuators and can be taken further along the crossed roadway marking parallel such that the longitudinal centerline of the vehicle is offset from the roadway marking by less than the prescribed maximum lateral offset, and l2) the vehicle is slowed to a standstill immediately after expiry of the second prescribed or variable period that begins immediately after output of the second warning signal or with a time delay after this expiry.

In this case, the electronic control device effects open-loop or closed-loop control of the automatic intervention such that, as seen transversely with respect to the direction of travel, the roadway marking is arranged between the wheels on the axles of the vehicle, wherein the longitudinal centerline of the vehicle is laterally offset from the roadway marking by less than a prescribed maximum lateral offset. This maximum lateral offset may be smaller than half the track of the vehicle and in particular equal to zero.

Furthermore, the electronic control device may be configured so that the vehicle is automatically kept in the crossed state of the roadway marking only if the first sensor device has previously checked whether there is an object on the edge of the roadway in front of the vehicle in the direction of travel, e.g. a vehicle stationary at that location, and this check is revealed that this is not the case. Otherwise, the electronic control device may be configured so that the vehicle is returned to the lane it has left, which may be by automatic intervention in the driving dynamics.

As already explained above, the electronic control device can in particular comprise an electronic steering controller. Furthermore, a steering control element controlled by the steering controller, e.g. an auxiliary steering device, can be present that actively affects the steering of the vehicle, wherein the lateral offset of the longitudinal centerline of the vehicle in relation to the roadway marking is the controlled variable and is prescribed as a setpoint variable. The lateral offset is equal to zero, so that the vehicle has its longitudinal centerline guided for example approximately collinearly in relation to the roadway marking by the driver assistance system.

In particular, the first sensor device can contain a camera and/or radar system. The first sensor device can generally use ambient sensors, as contained e.g. by a camera system, in particular at least one video camera, and/or a radar system and/or a laser system and/or a GPS, but also a digital map, ad-hoc networks, car-to-car communication, etc., which can be used to ascertain the position of the vehicle in relation to the lane, and to ascertain the position, width, speed and direction of movement of ambient objects in the traffic area. The signals of the first sensor device can also be preprocessed and then made available to the electronic control device via an interface or via other systems or via other systems in the vehicle via an interface.

Particularly, the at least one operating device influencing the driving dynamics of the vehicle by virtue of the driver is an accelerator pedal, a brake pedal or a steering wheel of the vehicle and the second sensor device then may contain an electrical measured value pickup of the accelerator pedal, of the electrical brake pedal or a steering angle sensor at the steering wheel of the vehicle. It is then possible for the signals of the electrical measurement pickup(s) to be used to detect operation of the accelerator pedal, of the brake pedal or of the steering wheel of the vehicle and consequently intervention by the driver in the driving dynamics of the vehicle.

According to one development, the electronic control device is configured so that it detects operation of the accelerator pedal, of the brake pedal or of the steering wheel of the vehicle on the basis of a comparison of the measured values of the electrical measured value pickup at different times and compares them with one another.

The invention also relates to a vehicle having a driver assistance system as described above or having a driver assistance system that is provided with open-loop or closed-loop control according to a method described above.

Advantageous developments of the invention will emerge from the patent claims, the description and the drawings. The advantages cited in the introductory part of the description for features and for combinations of multiple features are merely exemplary and can take effect alternatively or cumulatively without the advantages necessarily having to be achieved by embodiments according to the invention.

Further features are evident from the drawings—in particular the depicted geometries and the relative dimensions of multiple assemblies in relation to one another and the relative arrangement and operative connection thereof. The combination of features of different embodiments of the invention or of features of different patent claims is likewise possible as a departure from the chosen back-references of the patent claims and is suggested herewith. This also relates to features that are depicted in separate drawings or are cited in the description thereof. These features can also be combined with features of different patent claims. Similarly, features listed in the patent claims can be dispensed with for further embodiments of the invention.

Assemblies and subassemblies that are identical or have the same effect are denoted by the same reference numerals throughout different embodiments.

An exemplary embodiment of the invention is depicted below in the drawing and explained in more detail in the description below.

DETAILED DESCRIPTION

Figure 1:
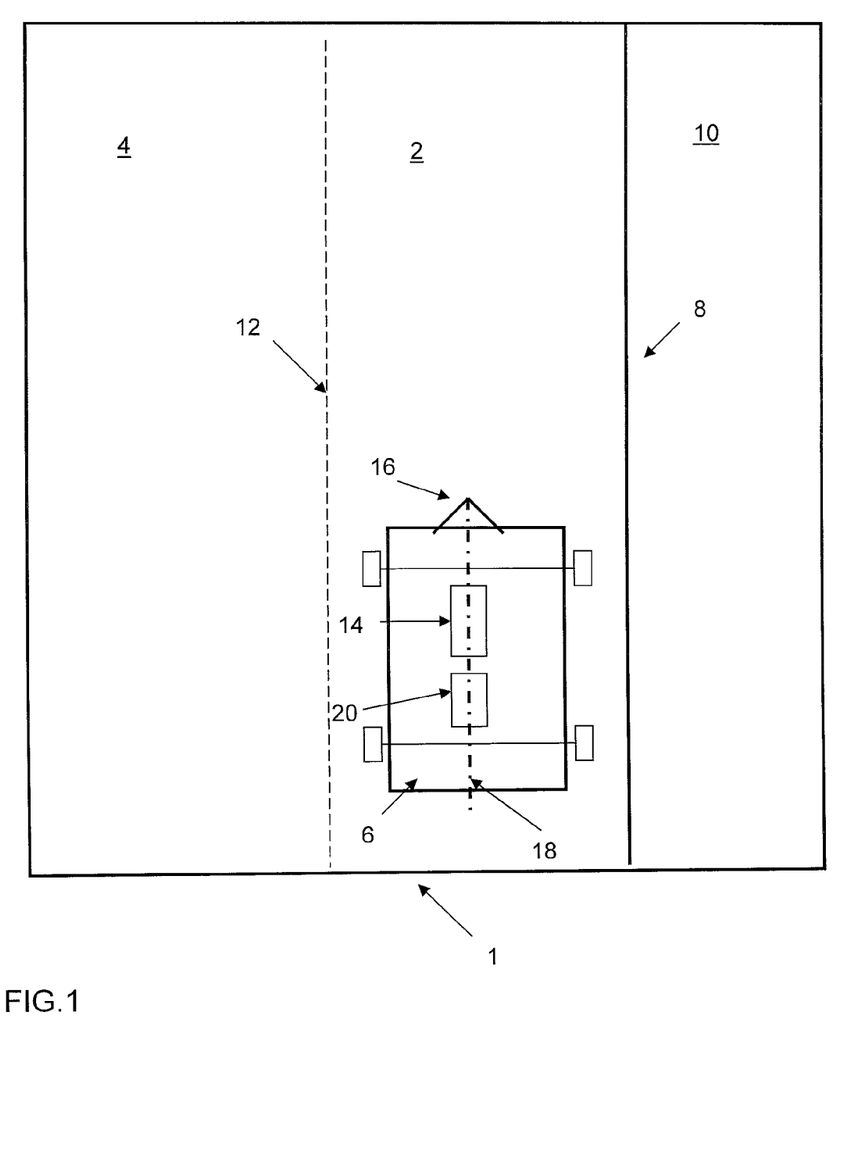
FIG. 1 shows a plan view of a roadway having a right-hand lane along which a vehicle moves.

FIG. 1 shows a plan view of a roadway 1, for example a freeway having a right-hand lane 2 and a left-hand lane 4, wherein the lanes 2 and 4 are traveled on by traffic in the same direction, for example, and wherein a vehicle 6, for example a heavy commercial vehicle, moves along the right-hand lane 2. The roadway 1 and also the right-hand lane 2 are bounded on the outside right by a right-hand roadway marking 8 denoted by a solid line, wherein, on the far side of the right-hand lane marking 8, an edge of the roadway, or shoulder, 10 is formed that can be traveled by at least a right-hand part of the vehicle 6. In this respect, the right-hand roadway marking 8 is a right-hand boundary marking for the roadway 1.

The two lanes 2, 4 are separated from one another by a lane boundary 12 denoted by a line shown in dashes. Furthermore, on the outside left of the roadway, there is also a left-hand roadway marking, not visible here, as a boundary marking for the roadway 1. FIG. 1 shows the situation in which the vehicle 6 moves at a certain speed approximately in the middle of the right-hand lane 2, as intended.

The vehicle 6 is equipped with a driver assistance system 14, not shown explicitly here, that has a first sensor device 16 that is used to detect the roadway 1 along with the surroundings and in particular the right-hand roadway marking 8. The first sensor device 16 can in particular be a camera and/or radar device that identifies the right-hand lane 2 traveled on here on the basis of the lane boundary 12 and the right-hand roadway marking 8 and, on the basis of the data obtained, can also ascertain the position and orientation of a central longitudinal centerline 18 of the vehicle 6 in relation to a middle of the right-hand lane 2 or else in relation to the right-hand roadway marking 8.

Furthermore, the vehicle 6 has, in a customary manner, an accelerator pedal, a brake pedal for operating a service brake device, which is electropneumatic in this case, for example, and a steering wheel for operating a steering device, which is electromechanical in this case, for example. The electropneumatic service brake device has, besides an electrical, driver-operable brake value generator, an electronic brake controller and also electropneumatic pressure regulating modules electrically controlled thereby that then take operation of the brake value generator as a basis for introducing a pneumatic pressure into pneumatic brake cylinders as brake actuators. Alternatively, a purely electrical, purely pneumatic or a purely hydraulic and also an electrohydraulic service brake device are also conceivable, however.

Since the degree of operation of the accelerator pedal, of the brake pedal and of the steering wheel are today normally detected by a respective electrical measured value pickup in order to introduce the data delivered by the measured value pickups into associated electronic control devices, for example into the electronic motor control, into the electronic brake control and into the electronic steering control, there is already a second sensor device 20 present that can be used by the driver assistance system 14 to detect operation of at least one operating device of the vehicle (accelerator pedal, brake pedal, steering wheel) that influences the driving dynamics of the vehicle by virtue of the driver.

By way of example, the vehicle has electromechanical or electrical steering augmented by an auxiliary steering system that can effect automatic steering intervention as automatic intervention in the driving dynamics of the vehicle 6. In this case, there is in particular closed-loop steering control present, having an electronic steering controller and having a steering actuating element as a steering actuator, for example in this case the auxiliary steering device, which actively effects the electromechanical or electrical steering of the vehicle and can regulate an actual steering angle to a setpoint steering angle.

Furthermore, the driver assistance system 14 has an electronic control device receiving sensor signals from the first sensor device 16 and from the second sensor device 20, and also a warning device that is controlled by the electronic control device and outputs warning signals. The warning signals can be audible and/or visual warning signals, the warning device being arranged on the vehicle 6, for example inside a driver's cab, such that he can detect the warning signals.

The electronic control device of the driver assistance system 14 then controls steering actuators of the steering device and/or brake actuators of the brake device, by which the driving dynamics of the vehicle are influencable. The electronic control device can be in the form of a standalone solution or else can be integrated in a further electronic controller, for example in an electronic brake controller of the service brake device. Since the electronic controllers or control devices of a vehicle normally communicate with one another via one or more data buses, data interchange among one another is ensured, as is sending of control commands.

The electronic control device of the driver assistance system furthermore interacts with a timing device.

Figure 5:
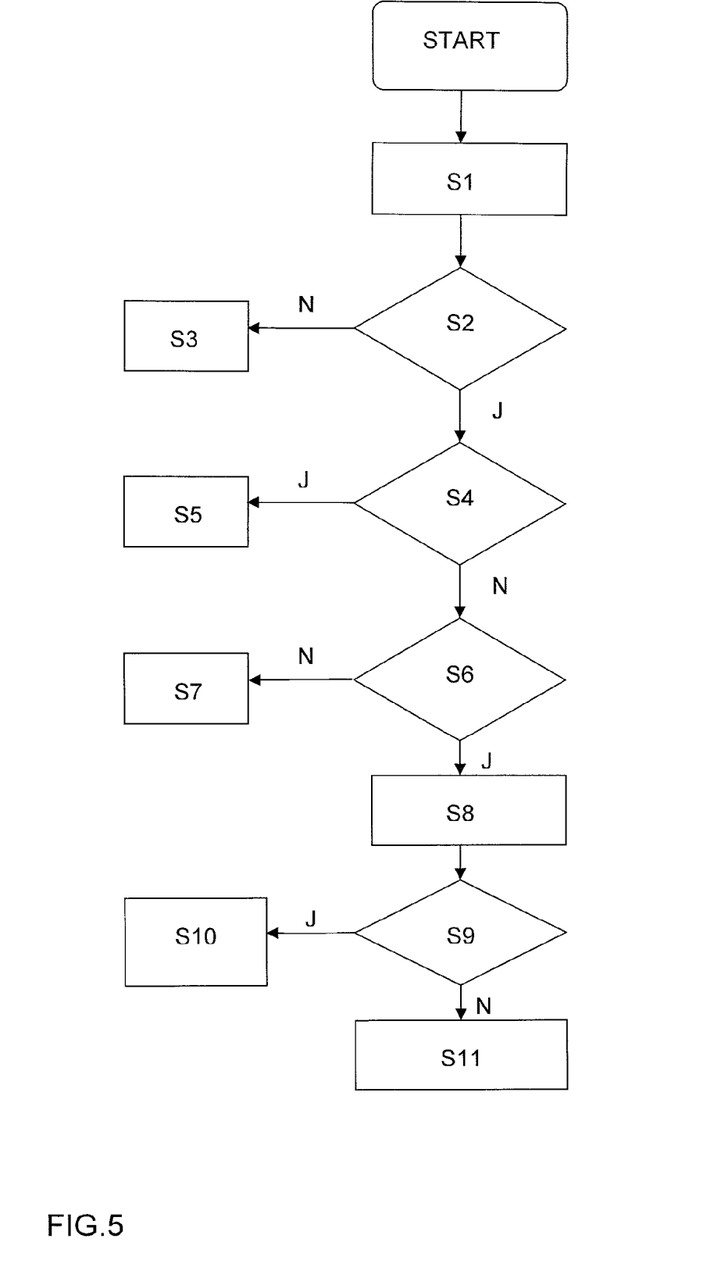
FIG. 5 shows a flowchart for a particular embodiment of a method for open-loop or closed-loop control of the driver assistance system according to the invention.

FIG. 5 shows a flowchart for a particular embodiment of a method for open-loop or closed-loop control of the driver assistance system according to the invention.

After the method starts, for which there is provision for operation of a separate switch provided for that purpose, for example, a step S1 involves the first sensor device 16 being used to detect the lane 2 in which the vehicle 6 is currently moving, i.e. for example in this case the right-hand lane 2, on the basis of an identification of the lane boundary 12 and the right-hand roadway marking 8, and the data obtained also being taken as a basis for ascertaining the position and possibly also the orientation of the central longitudinal centerline 18 of the vehicle 6 in relation to the right-hand roadway marking 8. In this case, it is also or exclusively possible for data external to the vehicle 6, such as from a GPS, for example, to be used, so that the first sensor device 16 can also comprise external signal sources of this kind.

Figure 2:
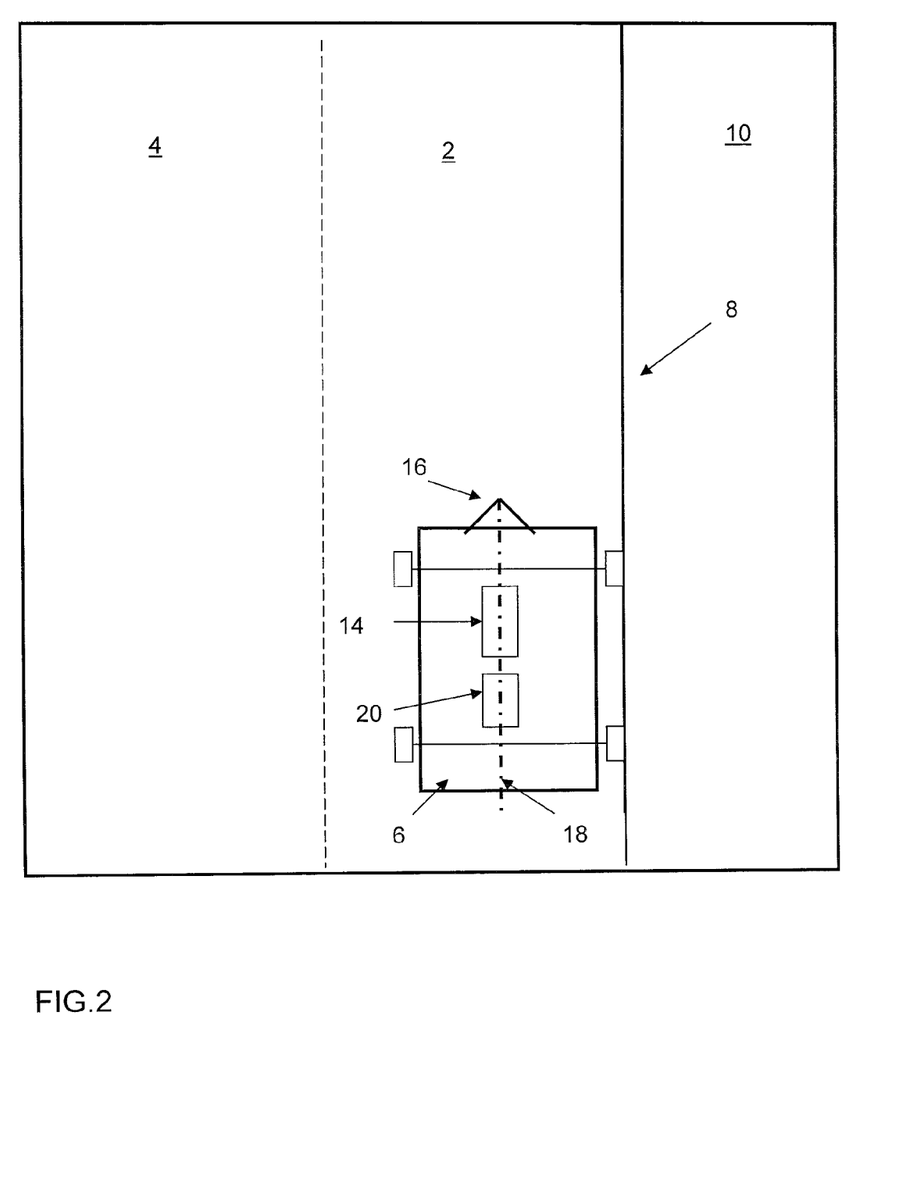
FIG. 2 shows a plan view of the roadway from FIG. 1, wherein the vehicle approaches a roadway marking of the right-hand lane that separates the lane from a right-hand edge of the roadway or from the right-hand shoulder.

The electronic control device of the driver assistance system 14 is configured so that, a threat of the vehicle 6 leaving the right-hand lane 2, as detected by the first sensor device 16, in particular in the direction of the right-hand roadway marking 8, results in its actuating the warning device to output a first warning signal. This situation is shown in FIG. 2 and symbolized by a "Y" for "YES" in step S2 of FIG. 5, with no threat of the vehicle 6 leaving the right-hand lane signified by an "N" for "NO". In the negative case, step S3 involves no first warning signal being generated and the method being terminated, because then a vehicle traveling approximately in the middle of the right-hand lane 2 as shown in FIG. 1 results in no need for intervention by the driver assistance system 14.

The electronic control device of the driver assistance system 14 is furthermore configured so that if operation of the at least one operating device influencing the driving dynamics of the vehicle 6 by virtue of the driver is detected by the second sensor device 20 within a first firmly prescribed or variable period that begins immediately after output of the first warning signal ("Y" in step S2 on account of the threat of the lane 2 being left in the direction of the right-hand roadway marking 8), this corresponding to "Y" for "YES" in step S4, the electronic control device of the driver assistance system 14 performs no automatic intervention in the driving dynamics of the vehicle by the steering actuators and/or by the brake actuators in step S5. This is because when operating the accelerator pedal, the brake pedal and/or the steering wheel, the driver has signaled to the electronic control device of the driver assistance system, in response to the first warning signal, that he has taken responsibility and can himself steer the vehicle back to the middle of the right-hand lane 2.

If, however, in step S4, operation of the at least one operating device influencing the driving dynamics of the vehicle by virtue of the driver is not detected by the second sensor device 20 within the first firmly prescribed or variable period that begins immediately after output of the first warning signal ("Y" in step S2 on account of the threat of the lane 2 being left in the direction of the right-hand roadway marking 8), this corresponding to "N" for "NO" in step S4, then the first sensor device 16 is used in step S6 to monitor crossing of the right hand roadway marking 8 by at least one wheel of the vehicle 6 that has taken place. This is accomplished for example by virtue of the distance of the longitudinal centerline 18 of the vehicle 6 from the right-hand roadway marking 8 being determined and being related to the track of the vehicle 6.

If, in step S6, the first sensor device 16 signals to the electronic control device of the driver assistance system that the right-hand roadway marking 8 has not been crossed by at least one wheel of the vehicle, this corresponding to "N" for "NO" in step S6, then step S7 involves the electronic control device of the driver assistance system not automatically intervening in the driving dynamics of the vehicle by the steering actuators and/or by the brake actuators. The reason is that there is then (still) no need for action.

Figure 3:
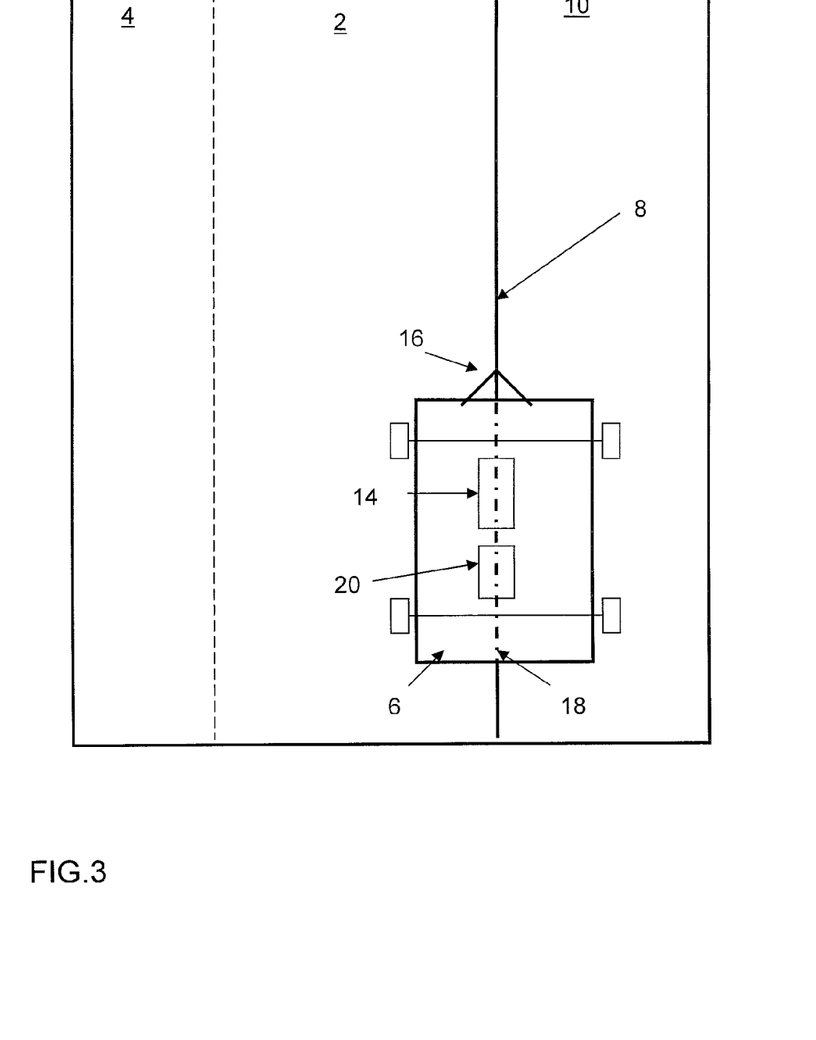
FIG. 3 shows a plan view of the roadway from FIG. 1, wherein the vehicle has crossed the roadway marking of the right-hand lane and, under open-loop or closed-loop control by a particular embodiment of a driver assistance system according to the invention, continues to move along this roadway marking.

If, however, in step S6, it is signaled to the electronic control device of the driver assistance system that the right-hand roadway marking 8 has already been crossed completely by at least one wheel of the vehicle, this corresponding to "Y" for "YES" in step S6, then the electronic control device of the driver assistance system is furthermore configured so that step S8 involves the warning device being actuated to output a second warning signal and the vehicle 6 automatically being kept in the crossed state of the right-hand roadway marking 8 as automatic intervention in the driving dynamics of the vehicle by the steering actuators and/or the brake actuators and being taken further along the crossed roadway marking 8 parallel thereto such that the longitudinal centerline 18 of the vehicle 6 is approximately coaxial with the right-hand roadway marking 8. Alternatively, however, it is also possible for a certain maximum lateral offset of the longitudinal centerline 18 of the vehicle 6 in relation to the right-hand roadway marking 8 to be permitted on both sides. The maximum lateral offset is in this case may be smaller than half the track of the vehicle 6. The maximum lateral offset may be substantially equal to zero, however. This situation is shown in FIG. 3, in which a respective right-hand wheel on each axle is on the far side of the right-hand roadway marking 8. The automatic driving-dynamics intervention can in this case be effected by the steering device alone and/or by the service brake device, for example as a result of electrical actuation of the pressure regulating modules such that e.g. asymmetric or unilateral braking actions are used to exert a certain steering effect on the vehicle 6 in order to keep it on the target trajectory described above, in this case in the form of the right-hand roadway marking 8, which, besides straight sections, can also contain curved sections, of course. Furthermore, besides open-loop control, closed-loop control of the position of the longitudinal centerline 18 of the vehicle 6 in relation to the right-hand roadway marking is also possible in this case.

If, in step S9, the electronic control device of the driver assistance system then establishes that operation of the at least one operating device influencing the driving dynamics of the vehicle by virtue of the driver is detected by the second sensor device 20 within a second firmly prescribed or variable period that begins immediately after output of the second warning signal, this corresponding to "Y" for "YES" in step S9, then the automatic intervention in the driving dynamics of the vehicle is terminated in step S10. The reason is that by operating the accelerator pedal, the brake pedal and/or the steering wheel the driver has signaled to the electronic control device of the driver assistance system 14, in response to the second warning signal, that he has taken responsibility and can himself steer the vehicle 6 back to the middle of the right-hand lane 2.

If, however, in step S9, the electronic control device of the driver assistance system establishes that operation of the at least one operating device influencing the driving dynamics of the vehicle by virtue of the driver is not detected by the second sensor device 20 within the second prescribed or variable period that begins immediately after output of the second warning signal, this corresponding to "N" for "NO" in step S9, then in step 11 the vehicle 6 continues to be automatically kept, by the steering actuators and/or the brake actuators, in the partially crossed state of the right-hand roadway marking 8 and taken further along the crossed right-hand roadway marking 8 parallel thereto such that the longitudinal centerline 18 of the vehicle 6 keeps to the prescribed maximum lateral offset from the right-hand roadway marking 8 (open-loop or closed-loop control), which is equal to zero in this case, for example, and the vehicle 2 is slowed to a standstill by the service brake device immediately after expiry of the second prescribed or variable period that begins immediately after output of the second warning signal, or with a time delay after this expiry. This situation is shown in FIG. 4.

Figure 4:
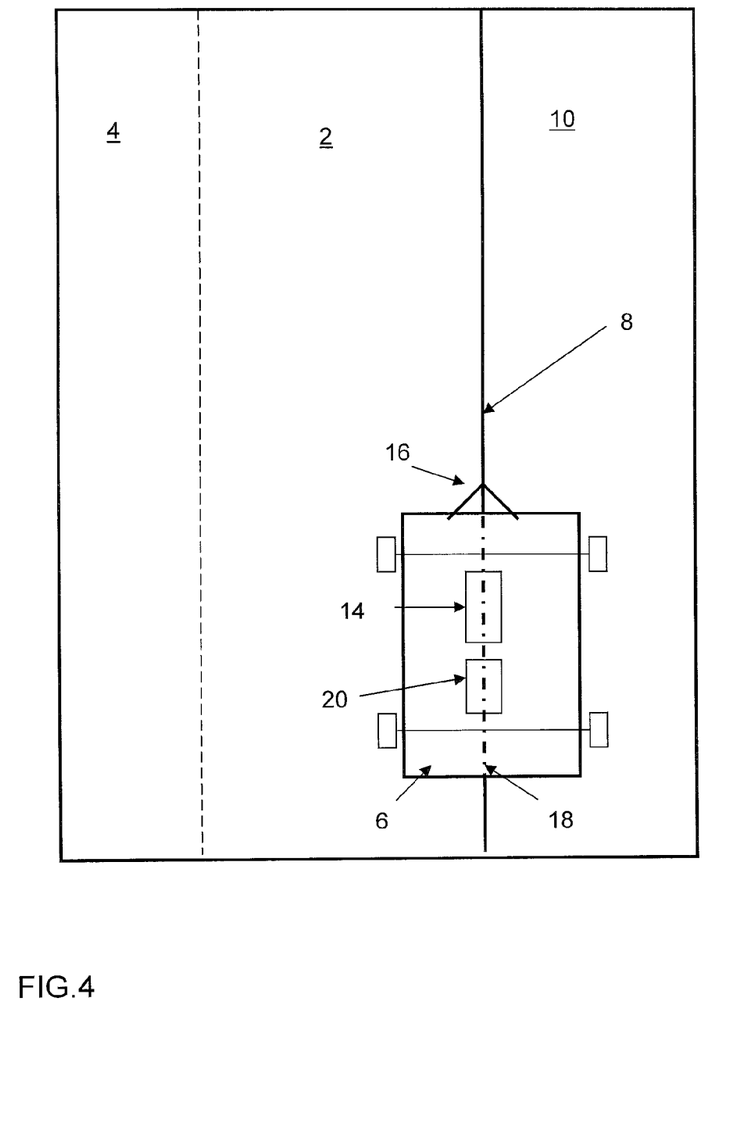
FIG. 4 shows a plan view of the roadway from FIG. 1, wherein the vehicle continues to move along the right-hand roadway marking and is slowed in the process.

In the state in which the vehicle 6 is slowed to a standstill in FIG. 4, the electronic control device of the driver assistance system 14 can then put the vehicle 6 into a safe mode, in which the ignition is switched off, for example. On top of that, still further safety measures can be taken, such as for example tightening restraining devices such as safety belts.

The same method, or open-loop control thereof by the driver assistance system 14, is applicable even if the vehicle 6 is in the left-hand lane 4, for example when the method according to the invention starts, and then shows a tendency to move in the direction of the right-hand roadway marking 8.

It is furthermore clear that the method according to the invention and the driver assistance system 14 according to the invention are not restricted to use for right-hand traffic and then right-hand roadway markings 8, but can also be used for left-hand traffic and left-hand roadway markings.

LIST OF REFERENCE SIGNS

1 Roadway
2 Right-hand lane
4 Left-hand lane
6 Vehicle
8 Right-hand roadway marking
10 Shoulder
12 Lane boundary
14 Driver assistance system
16 First sensor
18 Longitudinal centerline
20 Second sensor device

The invention claimed is:

1. A method for open-loop or closed-loop control of a driver assistance system of a vehicle, the method comprising:
 a) using a first sensor device to detect from a roadway at least one lane and a roadway marking that separates the lane from an edge of the roadway;
 b) using a second sensor device to detect operation of at least one operating device of the vehicle that influences driving dynamics of the vehicle by the driver;
 c) using steering actuators and/or brake actuators to influence the driving dynamics of the vehicle; and
 d) outputting, if there is a threat of the vehicle leaving the lane, as detected by the first sensor device, a first warning signal;
 wherein:
 e) if operation of the at least one operating device influencing the driving dynamics of the vehicle by the driver is detected by the second sensor device within a first firmly prescribed or variable period that begins immediately after output of the first warning signal, there is no automatic intervention in the driving dynamics of the vehicle by the steering actuators and/or brake actuators,
 f) but if operation of the at least one operating device influencing the driving dynamics of the vehicle by the driver is not detected by the second sensor device within the first firmly prescribed or variable period that begins immediately after output of the first warning signal, but crossing of the lane marking by at least one wheel of the vehicle that has already taken place is detected by the first sensor device, then
 g) a second warning signal is output, and the vehicle is automatically kept by the driver assistance system in the crossed state of the roadway marking as automatic intervention in the driving dynamics of the vehicle by the steering actuators and/or the brake actuators and, in the process, is taken by the driver assistance system further along the crossed roadway marking parallel such that a longitudinal centerline of the vehicle is offset from the roadway marking by less than a prescribed maximum lateral offset, and
 h) if operation of the at least one operating device influencing the driving dynamics of the vehicle by the driver is detected by the second sensor device within a second firmly prescribed or variable period that begins immediately after output of the second warning signal, then the automatic intervention in the driving dynamics of the vehicle is terminated, but if
 i) operation of the at least one operating device influencing the driving dynamics of the vehicle by the driver is not detected by the second sensor device within the second firmly prescribed or variable period that begins immediately after output of the second warning signal, then
  i1) the vehicle continues to be automatically kept by the driver assistance system in the crossed state of the roadway marking by the steering actuators and/or the brake actuators and can be taken by the driver assistance system further along the crossed roadway marking parallel such that the longitudinal centerline of the vehicle is offset from the roadway marking by less than the prescribed maximum lateral offset, and
  i2) the vehicle is automatically slowed to a standstill immediately after expiry of the second prescribed or variable period or with a time delay after the expiry.

2. The method of claim 1, wherein the vehicle in the state slowed to a standstill is put into a safe mode in which at least one of the following actions is performed: a parking brake is applied, the braking pressure most recently in effect in a service brake is maintained, hazard lights are switched on.

3. The method of claim 1, wherein the vehicle is automatically kept by the driver assistance system in the crossed state of the roadway marking only if the first sensor device has previously been used to check whether there is an object at the edge of the roadway in front of the vehicle in the direction of travel and this check has revealed that this is not the case.

4. The method of claim 1, wherein the first sensor device must be used to detect that the roadway marking has been crossed by at least two wheels on different axles and on one side of the vehicle before step g) is performed.

5. The method of claim 1, wherein the lateral offset according to step g) is a controlled variable that is regulated to a setpoint variable by closed-loop steering control.

6. The method of claim 1, wherein the automatic intervention in the driving dynamics of the vehicle, which are affected by the steering actuators and/or which are affected by the brake actuators, is carried out such that the roadway marking is arranged between the wheels of the axles of the vehicle.

7. The method of claim 1, wherein the automatic intervention in the driving dynamics of the vehicle is accomplished by an auxiliary steering system or a steer-by-brake system.

8. The method of claim 1, wherein the first sensor device contains at least one of: a camera system, a radar system, laser system, and a GPS.

9. The method of claim 1, wherein the at least one operating device influencing the driving dynamics of the vehicle by the driver contains an accelerator pedal, a brake pedal or a steering wheel of the vehicle and the second sensor device contains an electrical measured value pickup of the accelerator pedal, of the electrical brake pedal or a steering angle sensor of the steering wheel of the vehicle.

10. The method of claim 1, wherein the electronic control device is operable so that it detects operation of the accelerator pedal, of the brake pedal or of the steering wheel of the vehicle on the basis of a comparison of the measured values of the electrical measured value pickup at different times and compares them with one another.

11. The method of claim 1, wherein the prescribed maximum lateral offset of the longitudinal centerline of the vehicle in relation to the roadway marking is smaller than half the track of the vehicle.

12. A driver assistance system of a vehicle, comprising:
a) a first sensor device to detect from a roadway at least one lane and a roadway marking that separates the lane from an edge of the roadway, wherein the driver assistance system is controlled by an open-loop or a closed-loop;
b) a second sensor device to detect operation of at least one operating device of the vehicle that influences driving dynamics of the vehicle by the driver;
c) an electronic control device to receive sensor signals from the first sensor device and from the second sensor device;
d) a warning device controlled by the electronic control device to output warning signals, including outputting, if there is a threat of the vehicle leaving the lane, as detected by the first sensor device, a first warning signal; and
e) steering actuators and/or brake actuators, which are controllable by the electronic control device to influence the driving dynamics of the vehicle;
wherein:
f) the electronic control device is operable so that the threat of the vehicle leaving the lane, as detected by the first sensor device, results in actuation of the warning device to output the first warning signal,
g) the control device interacts with a timing device and is furthermore operable so that
h) if operation of the at least one operating device influencing the driving dynamics of the vehicle by the driver is detected by the second sensor device within a first firmly prescribed or variable period that begins immediately after output of the first warning signal, the control device does not initiate automatic intervention in the driving dynamics of the vehicle by the steering actuators and/or brake actuators,
i) but if operation of the at least one operating device influencing the driving dynamics of the vehicle by the driver is not detected by the second sensor device within the first firmly prescribed or variable period that begins immediately after output of the first warning signal, but crossing of the roadway marking by at least one wheel of the vehicle that has taken place is detected by the first sensor device, then
j) the warning device is actuated to output a second warning signal and the vehicle is automatically kept by the driver assistance system in the crossed state of the roadway marking as automatic intervention in the driving dynamics of the vehicle by the steering actuators and/or the brake actuators and, in the process, is taken by the driver assistance system further along the crossed roadway marking parallel such that a longitudinal centerline of the vehicle is offset from the roadway marking by less than a prescribed maximum lateral offset, and
k) if operation of the at least one operating device influencing the driving dynamics of the vehicle by the driver is detected by the second sensor device within a second firmly prescribed or variable period that begins immediately after output of the second warning signal, then the automatic intervention in the driving dynamics of the vehicle is terminated, but if
l) operation of the at least one operating device influencing the driving dynamics of the vehicle by the driver is not detected by the second sensor device within the second firmly prescribed or variable period that begins immediately after output of the second warning signal, then
l1) the vehicle continues to be automatically kept by the driver assistance system in the crossed state of the roadway marking by the steering actuators and/or the brake actuators and can be taken by the driver assistance system further along the crossed roadway marking parallel such that the longitudinal centerline of the vehicle is offset from the roadway marking by less than the prescribed maximum lateral offset, and
l2) the vehicle is automatically slowed to a standstill immediately after expiry of the second prescribed or variable period that begins immediately after output of the second warning signal or with a time delay after the expiry.

13. The driver assistance system of claim 12, wherein the electronic control device effects open-loop or closed-loop control of the automatic intervention such that the roadway marking is arranged between the wheels of the axles of the vehicle and the longitudinal centerline of the vehicle is offset from the roadway marking by less than the prescribed maximum lateral offset.

14. The driver assistance system of claim 12, wherein the electronic control device is operable so that the vehicle is automatically kept by the driver assistance system in the crossed state of the roadway marking only if the first sensor device has previously checked whether there is an object at the edge of the roadway in front of the vehicle in the direction of travel and this check is revealed that this is not the case.

15. The driver assistance system of claim 12, wherein the electronic control device includes an electronic steering controller and in that steering actuating element controlled by the steering controller is present that actively affects a steering of the vehicle, wherein the lateral offset of the longitudinal centerline of the vehicle in relation to the roadway marking is the controlled variable and is prescribed as a setpoint variable.

16. The driver assistance system of claim 12, wherein the first sensor device contains at least one of: a camera system, a radar system, a laser system, and a GPS.

17. The driver assistance system of claim 12, wherein the at least one operating device influencing the driving dynamics of the vehicle by the driver contains an accelerator pedal, a brake pedal or a steering wheel of the vehicle and the second sensor device contains an electrical measured value pickup of the accelerator pedal, of the electrical brake pedal or a steering angle sensor of the steering wheel of the vehicle.

18. The driver assistance system of claim 12, wherein the electronic control device is operable so that it detects operation of the accelerator pedal, of the brake pedal or of the steering wheel of the vehicle on the basis of a comparison of the measured values of the electrical measured value pickup at different times and compares them with one another.

19. The driver assistance system of claim 12, wherein the prescribed maximum lateral offset of the longitudinal centerline of the vehicle in relation to the roadway marking is smaller than half the track of the vehicle.

20. A vehicle, comprising:
a driver assistance system, including:
a) a first sensor device to detect from a roadway at least one lane and a roadway marking that separates the lane from an edge of the roadway, wherein the driver assistance system is controlled by an open-loop or a closed-loop;
b) a second sensor device to detect operation of at least one operating device of the vehicle that influences driving dynamics of the vehicle by of the driver;
c) an electronic control device to receive sensor signals from the first sensor device and from the second sensor device;
d) a warning device controlled by the electronic control device to output warning signals, including outputting, if there is a threat of the vehicle leaving the lane, as detected by the first sensor device, a first warning signal; and
e) steering actuators and/or brake actuators, which are controllable by the electronic control device to influence the driving dynamics of the vehicle;
wherein:
f) the electronic control device is operable so that the threat of the vehicle leaving the lane, as detected by the first sensor device, results in actuation of the warning device to output the first warning signal,
g) the control device interacts with a timing device and is furthermore operable so that
h) if operation of the at least one operating device influencing the driving dynamics of the vehicle by the driver is detected by the second sensor device within a first firmly prescribed or variable period that begins immediately after output of the first warning signal, the control device does not initiate automatic intervention in the driving dynamics of the vehicle by the steering actuators and/or brake actuators,
i) but if operation of the at least one operating device influencing the driving dynamics of the vehicle by the driver is not detected by the second sensor device within the first firmly prescribed or variable period that begins immediately after output of the first warning signal, but crossing of the roadway marking by at least one wheel of the vehicle that has taken place is detected by the first sensor device, then
j) the warning device is actuated to output a second warning signal, and the vehicle is automatically kept by the driver assistance system in the crossed state of the roadway marking as automatic intervention in the driving dynamics of the vehicle by the steering actuators and/or the brake actuators and, in the process, is taken further along the crossed roadway marking parallel such that a longitudinal centerline of the vehicle is offset from the roadway marking by less than a prescribed maximum lateral offset, and
k) if operation of the at least one operating device influencing the driving dynamics of the vehicle by the driver is detected by the second sensor device within a second firmly prescribed or variable period that begins immediately after output of the second warning signal, then the automatic intervention in the driving dynamics of the vehicle is terminated, but if
l) operation of the at least one operating device influencing the driving dynamics of the vehicle by the driver is not detected by the second sensor device within the second firmly prescribed or variable period that begins immediately after output of the second warning signal, then
l1) the vehicle continues to be automatically kept by the driver assistance system in the crossed state of the roadway marking by the steering actuators and/or the brake actuators and can be taken by the driver assistance system further along the crossed roadway marking parallel such that the longitudinal centerline of the vehicle is offset from the roadway marking by less than the prescribed maximum lateral offset, and
l2) the vehicle is automatically slowed to a standstill immediately after expiry of the second prescribed or variable period that begins immediately after output of the second warning signal or with a time delay after the expiry.

* * * * *